United States Patent Office 3,216,962
Patented Nov. 9, 1965

3,216,962
THICKENED ACIDIC COMPOSITIONS
Eugene M. Gatza, Bay City, Mich., assignor to The Dow Chemical Company, Midland, Mich., a corporation of Delaware
No Drawing. Filed June 7, 1961, Ser. No. 115,325
11 Claims. (Cl. 260—29.6)

The present invention concerns thickened, liquid compositions and, in particular, relates to compositions comprising an aqueous solution of a water-soluble, organic or inorganic, acid having an ionization constant above about $1.7 \times 10^{-5}$ and an organic thickening system of a water-dispersible polymer sulfonate and a water-soluble, organic, thickening promoter of the invention.

"Polymer sulfonates," as employed herein, refers to polymeric resins having a molecular weight above about 1000 which resins are highly substituted with sulfonic groups. The terminology "water-dispersible" as applied to the polymer sulfonates means dispersible in water so as to form a visually homogeneous solution or dispersion. Such language is inclusive of those polymer sulfonates which are characterized in the art as water soluble or highly water swellable. "Water-soluble," as generally employed herein, refers to significant solubilities such as, for example, at least about 1 part of a solute per 100 parts of water.

The effectiveness of water-dispersible polymer sulfonates as thickeners in aqueous compositions is known to vary according to the molecular weight of the polymer, the degree of substitution of sulfonic groups thereon and the linearity of the polymer. Also having an important bearing on the thickening achieved are such factors as the presence of an electrolyte in the solution, the chemical character of such electrolyte and its concentration. In the latter regard, for instance, it is known that acidic electrolytes depress the viscosity of aqueous solutions thickened with polymer sulfonates and, when present in sufficient concentrations, prevent dissolution of the polymer sulfonate. Such is especially true of acidic electrolytes having an ionization constant above about $1.7 \times 10^{-5}$. The larger the ionization constant, the more pronounced the tendency of the acid to depress the thickening activity of the polymer sulfonates in solution. Such effects are believed to be attributable to certain interionic phenomena which affect the polymer configuration and, therefore, its thickening properties. For an illuminating discussion of such interionic effects, see Fuoss and Strauss, "Viscosity of Mixtures of Polyelectroltyes in Simple Electrolytes," Annals of New York Academy of Sciences, volume 51, pages 836–851 (1949).

There are many oportunities for the utilization of thickened aqueous solutions of the above-described acids. Such reagents, for example, are often the active ingredients of slushing compositions for cleaning inert substrates such as removing rust from ferrous metals. Also, many of the acids, especially the stronger acids, are utilized in the treatment of oil wells and oil-bearing formations to improve the yield thereof. When utilized in such functions, their intended action is substantially improved by employing them in the form of a highly viscous or gel-like mass. In light of the foregoing, it is highly desirable to promote the efficacy of polymer sulfonates as thickeners for aqueous solutions of organic and inorganic acids having an ionization constant above $1.7 \times 10^{-5}$.

Accordingly, it is a principal object of the present invention to provide improved techniques for thickening aqueous compositions comprising one or more organic or inorganic acids. Especially it is an object of the invention to enhance the thickening effect achieved by incorporating water-dispersible polymer sulfonates into such compositions. Still further objects are to provide novel compositions most advantageously adapted for a wide variety of purposes such as removing oxidative deposits and protective coatings from inert substrates and treating oil-bearing formations. Other objects and benefits attending the practice of the present invention will become manifest hereinafter as the invention is more fully described.

In the present invention, the above and other objects are accomplished in an organic thickening system for aqueous compositions containing an acid selected from the group consisting of water-soluble organic and inorganic acids having an ionization constant above about $1.7 \times 10^{-5}$, which thickening system comprises a small but effective amount of a water-dispersible polymer sulfonate and at least a sufficient amount of a suitable, water-soluble thickening promoter to enhance the thickening effect achieved. Suitable thickening promoters include water-soluble alkylene and polyoxyalkylene glycols and alkyl and aryl monoethers thereof. Preferred glycols and monoethers of the glycols correspond to the general formula:

$$R—O—(C_nH_{2n}O)_x—H$$

wherein R is of the group consisting of hydrogen, alkyls having from 1 to 4 carbons and aryls having from 6 to 10 carbons, $n$ is an integer from 2 to 3, inclusive and $x$ is an integer from 1 to 6, inclusive. Also suitable are lower alkanols containing from 2 to 4 carbon atoms, dioxan, tetrahydrofuran, tetrahydrofurfuryl alcohol, glycerine, pentaerythritol, as well as halogenated derivatives of the aforementioned compounds. Further, it should also be understood that any compound which may undergo reaction with or be catalyzed in the thickened solution to provide the aforesaid water-soluble thickening promoters in situ can also be employed. The materials from which the promoters are derivable in the presence of suitable reagents are, for the purposes of the invention, termed promoter precursors.

The amount of a thickening promoter employed, whether it be an individual compound or a mixture, will vary according to the desired result and, as a practical matter, general economic considerations. When the amount of polymer sulfonate employed is within the usual range, e.g., about 0.1 up to about 10 percent by weight of the total aqueous composition, measurable enhancement of the resulting thickening effect is achieved by incorporating into such solution as little as about 0.5 percent by weight of the solution of a thickening promoter. Preferably, the amount of the thickening promoter employed is from about 1 up to about 10 percent by weight of the aqueous solution. The upper limit is not critical, however, as the benefits of the invention may be observed when as much as 30 percent by weight of the promoter is employed.

Water-dispersible polymer sulfonates that can be employed in the present invention include any polymer sulfonates which are either highly water swellable or completely water soluble. Such polymers may be obtained by polymerizing ethylenically unsaturated monomer compositions of which at least a major proportion, e.g., at least about 60 percent, is a sulfonated, monoethylenically unsaturated monomer. It is generally believed that at least about 60 percent of the combined monomer units should have sulfonic substitution in order to provide at least a water-swellable product. Higher amounts of sulfonic substitution tend to give increasing water solubility. Other water-dispersible polymer sulfonates can be obtained by direct sulfonation of linear or toluene-solube polymers of ethylenically unsaturated monomers in which polymers at least a major proportion of the combined monomer units is capable of substitution with a sulfonate group in the presence of known sulfonating reagents. Still other sources of water-dispersible polysulfonate resins are the sulfonation products of phenol-formaldehyde and the like sulfonatable condensation polymer systems.

The term "sulfonate" as employed herein means the free sulfonic acid and its salts wherein the cationic counter ion may be hydrogen or a metal, ammonium, amine and the like salt-forming cations. Specific salt-forming moieties for the purpose of illustration are the alkali metals such as soduim, potassium, cesium and lithium; the alkaline earth metals such as magnesium and calcium, and the alkylamines such as methylamine, dimethylamine and trimethylamine.

When the polymer sulfonates are prepared by sulfonating a starting or base polymer, the polymer is preferably a toluene-soluble, thermoplastic, high molecular weight addition polymer having in combined form at least about 60 percent by weight of a monoalkenyl aromatic hydrocarbon or nuclear chlorinated alkenyl hydrocarbon having the general formula:

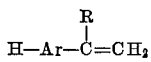

wherein H—Ar is a monovalent hydrocarbon or nuclear halogenated hydrocarbon radical having its valence bond on a carbon atom of a sulfonatable aromatic nucleus and R is a hydrogen or methyl radical. By "sulfonatable" is meant that the nucleus of the aromatic radical must have at least one hydrogen atom replaceable by a sulfonic acid group by reaction with a known sulfonating agent such as, for example, sulfuric acid, sulfur trioxide or chlorosulfonic acid.

Examples of sulfonatable base polymer resins are the solid, toluene-soluble, homopolymers of styrene, α-methylstyrene, ar-methylstyrene (ar-vinyltoluenes), ar-dimethylstyrenes, α,ar-dimethylstyrenes, ar-ethylstyrenes, vinylnaphthalenes and ar-chlorostyrenes; copolymers of two or more of such monoalkenylaromatic compounds, e.g., copolymers of styrene and ar-vinyltoluene and copolymers of styrene and α-methylstyrene; and copolymers of a major proportion, e.g., at least about 60 percent by weight, of one or more of such monoalkenylaromatic compounds and a minor proportion of one or more other monoethylenically unsaturated, polymerizable compounds that do not sulfonate in combined form when subjected to the action of sulfonated reagents. Examples of such copolymerizable compounds are isobutylene, acrylonitrile, acrylamide, alkyl esters of acrylic and methacrylic acids, etc.

In addition to the above-described polymers, which are essentially linear in character, lightly cross-linked polymers can also be employed as the base polymer for the sulfonation reaction. Such polymers are readily prepared by incorporating into the monomeric reaction mixture from which the above base polymers are prepared, a small quantity, e.g. up to about 2 percent of a polyfunctional cross-linking agent, such as divinylbenzene, divinylbenzenesulfonic acid, methylenebisacrylamide and the like. The resulting lightly cross-linked polymers are especially useful in the preparation of highly water-swellable grades of polymer sulfonate resins.

The above-described base polymers are, of course, well known and likewise methods for carrying out the sulfonation thereof are well established in the art. For examples of such methods, see United States Letters Patents Nos. 2,683,137, 2,809,959, 2,821,522 and 2,835,655. Sulfonation should be carried out to an extent at least sufficient to provide a water-swellable polymer. For this purpose, it is generally believed that sulfonation of about 60 percent of the combined monomers is sufficient but, as will be understood by those skilled in the art, the effect of certain variables such as the molecular weight of the polymeric material being sulfonated, the amount of sulfone or other cross-linking and the extent of polymer chain scission will affect the water-dispersibility of the resulting resin.

As mentioned above, the water-dispersible polysulfonate resins can also be prepared directly as the reaction product of polymerizable mixtures of monomers comprising a sufficient amount of a sulfonated monomer to provide at least a water-swellable resin product. Such polymers can be prepared in forms which are linear or lightly cross-linked.

The preparation of vinyl aromatic sulfonic acids that may be employed in the polymerization of such polymers is taught by Mock in United States Letters Patent No. 2,821,549. Such monomers can be homopolymerized in aqueous solutions according to known techniques. Mass polymerization techniques may be employed to prepare copolymers of such monomers with other monoethylenically unsaturated monomers.

The amount of polymer sulfonate employed in the practice of the invention will vary according to the desired thickening effect and the character of the sulfonated resin, e.g., whether it is lightly cross-linked or essentially linear. In those instances when the polymer sulfonate is initially dispersible in the acidic solution to be thickened without the presence of a thickening promoter of the invention, effective increases in the viscosity of the solution are obtained with as little as about 0.05 percent by weight of the polymer sulfonate based on the weight of the solution. While there is no critical upper limit on the amount of polymer sulfonate that can be dispersed in the solution, usually from about 0.1 up to about 10 percent of the polymer sulfonate is adequate to achieve any desired thickening effect varying from relatively small increases in viscosity to the production of gel-like masses. The incorporation of the thickening promoter of the invention into such solutions substantially enhances the thickening effect that is obtained and subtsantially reduces the amount of polymer sulfonate required to obtain a given viscosity. In those instances when the polymer sulfonate is not initially dispersible in the aqueous acidic solution to be thickened without the presence of the thickening promoter of the invention, a small but effective quantity, e.g., usually from about 1 up to about 5 percent by weight of the solution of the thickening promoter will produce a homogeneous thickened composition. Until the thickening promoter is added to the solution in such instances, little or no thickening effect is achieved.

The benefits of the invention will be observed in acidic aqueous compositions containing a significant proportion of one or more inorganic or organic acids as defined above. With the stronger and more highly ionized acids, as little as about about 0.1 percent by weight of the solution of such acids is a significant proportion. The presence in solution of this amount of the acid will usually result in a pronounced decrease in the thickening effect provided by a given amount of a water-dispersible polymer sulfonate. Solutions with larger concentrations of the acidic solute, e.g., up to as much as about 25 percent of the solution, in the instances of the stronger acid, or up to as much as 50 percent of the solution, in the instances of the weaker acids, can also be thickened with advantage in accordance with the present invention. When thickening the stronger acids, the presence of a thickening promoter may be necessary before the polymer sulfonate can be dispersed into the acidic solution to be thickened.

Specific acidic compositions that can be thickened in accordance with the present invention include aqueous solutions of one or more water-soluble organic or inorganic acids having an ionization constant above about $1.7 \times 10^{-5}$. Included are such inorganic acids as hydrofluoric, hydrochloric, hydrobromic, hydrodic, perchloric, iodic, sulfuric, sulfurous, phosphoric, pyrophosphoric nitric, arsenic and the like. Organic acids included are acetic, acrylic, adipic, benzoic, chloroacetic, dichloroacetic, trichloroacetic, bromoacetic, bromopropionic, o- chlorobenzoic, iodobenzoic, o-nitrobenzoic, oxalic, maleic, succinic, salicylic and the like organic acids. In addition to the dissolved acids, the compositions thickened in accordance with the present invention may also contain undissolved, e.g., suspended or dispersed, materials such as colloidally suspended pigments and clays or emulsified organic solvents as well as any of the large variety of other chemically compatible, water-soluble solutes which may be either inorganic or organic in nature.

The compositions of the present invention are prepared by mixing the constituents thereof together in conventional ways. Solely for illustration, it might be mentioned that such compositions are prepared by mixing a polymer sulfonate and thickening promoter into an aqueous solution of an acid, by mixing both the polymer sulfonate and acid into an aqueous solution of a thickening promoter or by mixing together aqueous solutions of a polymer sulfonate, a thickening promoter and an acid. While there may be differences in the initial characteristics of the thickened composition dependent upon the method by which it is prepared, in general the final properties of the thickened aqueous composition obtained at equilibrium will be determined by its composition and not the mode of its preparation.

percent of the recurring vinyltoluene moieties having a sulfonic group thereon. The polymer sulfonate did not dissolve but appeared as an agglomerate at the surface of the acid solution. Subsequently, 3 percent by weight of diethylene glycol monoethyl ether was added to the solution with stirring whereupon a homogeneous thickened composition was obtained. The Brookfield viscosity of the thickened solution at 25° C., as determined with a No. 3 spindle rotated at 12 r.p.m., was 30 centipoises. Other runs were made in which dioxan, glycerine, pentaerythritol and a polyethylene glycol having an average molecular weight of 200 were employed in the place of the diethylene glycol monoethyl ether thus achieving Brookfield viscosities, measured as above, of 19, 18, 25 and 25 centipoises, respectively.

Example 2

Other aqueous acidic solutions were thickened with the polymer sulfonate employed in the foregoing example. The viscosities of the thickened compositions at 25° C. were determined with a Brookfield viscosimeter employing a No. 3 spindle rotated at 12 r.p.m. The compositions and results obtained for thickened compositions with and without a thickening promoter of the invention are reported in the following Table 1.

TABLE 1

| Runs | Composition | | | | | | Brookfield Viscosity (cps.) | |
|---|---|---|---|---|---|---|---|---|
| | Percent[1] | Polymer Sulfonate | Percent[1] | Acid | Percent[1] | Promoter | Initial | After X Days |
| 1 | 2 | SPVT | 20 | $HNO_3$ | | | 60 | |
| 2 | 2 | SPVT | 20 | $HNO_3$ | 5 | Diethylene glycol monoethyl ether. | 100 | |
| 3 | 2 | SPVT | 20 | $H_3PO_4$ | | | 3,600 | 225:X=37 |
| 4 | 2 | SPVT | 20 | $H_3PO_4$ | 5 | Isopropanol | 5,900 | 3,000:X=37 |
| 5 | 1.5 | SPVT | 35 | $H_3PO_4$ | | | 175 | |
| 6 | 1.5 | SPVT | 35 | $H_3PO_4$ | 3 | Diethylene glycol monoethyl ether. | 580 | |
| 7 | 2 | SPVT | 17 | $H_3PO_3$ | | | 695 | 640:X=2 |
| 8 | 2 | SPVT | 17 | $H_3PO_3$ | 5 | Diethylene glycol monoethyl ether. | 690 | 760:X=2 |
| 9 | 2 | SPVT | 9 | Oxalic | | | 620 | 15:X=2 |
| 10 | 2 | SPVT | 9 | Oxalic | 5 | Diethylene glycol monoethyl ether. | 1,425 | 90:X=2 |
| 11 | 2 | SPVT | 20 | Acetic | | | 1,640 | |
| 12 | 2 | SPVT | 20 | Acetic | 5 | Diethylene glycol monoethyl ether. | 1,800 | |

[1] Percentages are based on the total weight of the composition.

The compositions of the invention thickened with the enhanced organic thickening system described above, are useful as acid slushing compositions to clean inert substrates. Certain of the thickened acidic compositions, especially the stronger acids, are most advantageously adaptable for use in the treatment of oil wells. When thickened in accordance with the invention, they form enhanced but unstable viscous compositions which regrade after a short period into relatively fluid masses. Such compositions can be forced into a well wherein after a short period of time, they regain sufficient fluidity for easy removal in bailing or flushing operations. Other acids, such as those having agronomic utility, e.g., trichloroacetic acid, can be most efficaciously applied to and be maintained on plants treated in the form of a thickened aqueous solution.

The following examples illustrate the present invention but are not to be construed as limiting.

Example 1

To an aqueous 20 percent solution of sulfuric acid was added 2 percent by weight of a sulfonated polyvinyltoluene composition in the ammonium salt form containing about 45 percent active polymer solids having a molecular weight of at least 3,000,000 and an average degree of sulfonic substitution of about 98 percent, i.e., about 98

Example 3

A 15 percent hydrochloric acid solution suitable for employment in acidifying oil wells was thickened in accordance with the present invention. To a 15 percent aqueous solution of hydrochloric acid was added 3 percent by weight of the polymer sulfonate employed in the foregoing example. While the resulting composition was initially thickened, it soon degraded with the polymer sulfonate phasing out of solution. In other runs, about 5 percent of a monoalkyl ether of a glycol was added to the hydrochloric acid solution in addition to the polymer sulfonate. The presence of such a thickening promoter increased the period of time that the thickened compositions remained homogeneous and thickened by at least 500 percent of the corresponding period of time obtained without the presence of the thickening promoter. Thickening promoters that were employed included diethylene glycol monoethyl ether, diethylene glycol n-butyl ether, ethylene glycol n-butyl ether, ethylene glycol ethyl ether, propylene glycol methyl ether and dipropylene glycol methyl ether.

Other specific acidic solutions that are thickened in accordance with the invention include aqueous solutions containing up to about 25 percent by weight of an acid or mixture of acids such as perchloric, iodic, pyrophosphoric and oxalic acids or up to about 30 to 50 percent by weight of an acid or mixture of acids such as sulfurious, phosphoric, trichloroacetic, dichloroacetic, acetic, benzoic, bromopropionic, maleic, malonic, citraconic and the like aids. Of the foregoing classes of acidic solutions, the former, strong acids having an ionization constant above about $5 \times 10^{-2}$, yield relatively unstable thickened compositions which degrade after a period of time from a few hours to several days. The latter class of weaker acids having an ionization constant within the range from about $1.7 \times 10^{-5}$ up to about $5 \times 10^{-2}$, while generally undergoing some decrease in viscosity when thickened in accordance with the invention, remain as essentially homogeneous and thickened compositions for substantial periods of time up to and extending beyond several months.

What is claimed is:

1. A composition of matter comprising (1) water, (2) an acid having an ionization constant above about $1.7 \times 10^{-5}$, (3) a water-dispersible polymeric resin having a molecular weight above about 1,000 obtained by polymerizing ethylenically unsaturated monomers, which resin is highly substituted with sulfonic groups and (4) a small but effective amount for promoting thickening of a thickening promoter selected from the group consisting of compositions corresponding to the general formula:

$$R-O-(C_nH_{2n}O)_x-H$$

wherein R is of the group consisting of hydrogen, alkyls having from 1 to 4 carbons and aryls having from 6 to 10 carbons, $n$ is an integer from 2 to 3 and $x$ is an integer from 1 to 6, lower alkanols containing from 2 to 4 carbon atoms, dioxan, tetrahydrofuran, tetrahydrofurfuryl alcohol, glycerine and pentaerythritol.

2. A composition of matter as in claim 1 wherein the acid has an ionization constant above about $5 \times 10^{-2}$.

3. A composition of matter as in claim 1 wherein the acid has an ionization constant within the range from about $1.7 \times 10^{-5}$ up to about $5 \times 10^{-2}$.

4. A composition of matter as in claim 1 wherein the acid is hydrochloric acid.

5. A composition of matter as in claim 1 wherein the acid is sulfuric acid.

6. A composition of matter as in claim 1 wherein the acid is nitric acid.

7. A composition of matter as in claim 1 wherein the acid is phosphoric acid.

8. A composition of matter as in claim 1 wherein the acid is oxalic acid.

9. A composition of matter as in claim 1 wherein the water-dispersible, polymeric resin is a sulfonated polymer of ar-vinyltoluene.

10. A composition of matter as in claim 1 wherein the water-dispersible, polymeric resin is a polymer of an alkali metal vinyl benzene sulfonate.

11. A method for thickening liquid compositions comprising an aqueous solution of an acid having an ionization constant above about $1.7 \times 10^{-5}$, which method comprises the steps, in any order, of adding with mixing to the composition to be thickened (1) a water-dispersible polymeric resin having a molecular weight above about 1,000 obtained by polymerizing ethylenically unsaturated monomers, which resin is highly substituted with sulfonic groups and (2) a small but effective amount for promoting thickening of a thickening promoter selected from the group consisting of compositions corresponding to the general formula:

$$R-O-(C_nH_{2n}O)_x-H$$

wherein R is of the group consisting of hydrogen, alkyls having from 1 to 4 carbons and aryls having from 6 to 10 carbons, $n$ is an integer from 2 to 3 and $x$ is an integer from 1 to 6, lower alkanols containing from 2 to 4 carbon atoms, dioxan, tetrahydrofuran, tetrahydrofurfuryl alcohol, glycerine and pentaerythritol.

References Cited by the Examiner

UNITED STATES PATENTS

| 2,604,456 | 7/52 | Signer | 260—29.6 |
| 2,691,644 | 10/54 | Roth | 260—29.6 |
| 2,763,326 | 9/56 | Cardwell et al. | 166—42 |
| 2,778,427 | 1/57 | Cardwell et al. | 166—42 |

OTHER REFERENCES

Bailey et al., "Poly Ox," Industrial and Engineering Chemistry, vol. 50, No. 1, January 1958 (pages 8–11).

MURRAY TILLMAN, *Primary Examiner.*

LEON J. BERCOVITZ, *Examiner.*